(12) United States Patent
Tavildar et al.

(10) Patent No.: US 9,019,841 B2
(45) Date of Patent: Apr. 28, 2015

(54) ARCHITECTURE FOR RELAYS IN LTE USING D2D

(71) Applicant: QUALCOMM Incorporated, San Diego, CA (US)

(72) Inventors: Saurabh R. Tavildar, Jersey City, NJ (US); Eduardo S. Esteves, San Diego, CA (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 101 days.

(21) Appl. No.: 13/656,268

(22) Filed: Oct. 19, 2012

(65) Prior Publication Data

US 2014/0112158 A1 Apr. 24, 2014

(51) Int. Cl.
| | |
|---|---|
| H04W 72/04 | (2009.01) |
| H04B 7/14 | (2006.01) |
| H04B 7/155 | (2006.01) |
| H04B 7/26 | (2006.01) |

(52) U.S. Cl.
CPC .......... *H04B 7/15542* (2013.01); *H04B 7/2606* (2013.01)

(58) Field of Classification Search
CPC ........................... H04W 84/047; H04W 88/04
USPC .......... 370/315, 312, 329, 246, 248; 455/522, 455/7, 10
See application file for complete search history.

(56) References Cited

U.S. PATENT DOCUMENTS

| | | | |
|---|---|---|---|
| 7,889,699 B2* | 2/2011 | Suh et al. ...................... | 370/331 |
| 2004/0242154 A1* | 12/2004 | Takeda et al. .................. | 455/16 |
| 2008/0045139 A1* | 2/2008 | Chen et al. .................... | 455/3.04 |
| 2009/0296626 A1* | 12/2009 | Hottinen et al. ............... | 370/315 |
| 2009/0325480 A1* | 12/2009 | Ji et al. ............................. | 455/8 |
| 2009/0325625 A1* | 12/2009 | Hugl et al. ..................... | 455/522 |
| 2010/0172284 A1* | 7/2010 | Horiuchi et al. ............... | 370/315 |
| 2010/0238853 A1* | 9/2010 | Zhou et al. .................... | 370/315 |
| 2010/0316097 A1 | 12/2010 | Wang et al. | |
| 2011/0176445 A1* | 7/2011 | Chen .............................. | 370/252 |

(Continued)

FOREIGN PATENT DOCUMENTS

| | | |
|---|---|---|
| EP | 2330769 A1 | 6/2011 |
| WO | WO2012018894 A1 | 2/2012 |

OTHER PUBLICATIONS

Bin Chen et al., "Dynamic Spectrum Sharing between Uplink and Relay-Assisted Downlink," 2009 IEEE 67th Vehicular Technology Conference, Apr. 26, 2009, pp. 1-5.*

(Continued)

*Primary Examiner* — Rasheed Gidado
(74) *Attorney, Agent, or Firm* — James K. O'Hare

(57) ABSTRACT

A method, an apparatus, and a computer program product for wireless communication are provided. The apparatus receives downlink data from a base station via a downlink resource, sends the downlink data to a user equipment (UE) via an uplink resource, receives uplink data from the UE via the uplink resource, and sends the uplink data to the base station via the uplink resource. The apparatus also determines at least one of an observed downlink signal-to-interference-plus-noise ratio (SINR) or an observed uplink interference. The apparatus then broadcasts a relay availability based on the determination that the at least one of the downlink SINR observed is greater than a first threshold or the uplink interference at the relay is less than a second threshold.

28 Claims, 15 Drawing Sheets

(56) References Cited

U.S. PATENT DOCUMENTS

| | | |
|---|---|---|
| 2011/0222428 A1 | 9/2011 | Charbit et al. |
| 2011/0319090 A1 | 12/2011 | Vajapeyam et al. |
| 2012/0076070 A1* | 3/2012 | Takano ................. 370/315 |
| 2012/0159279 A1 | 6/2012 | Braithwaite |
| 2013/0029589 A1* | 1/2013 | Bontu et al. ................ 455/7 |

OTHER PUBLICATIONS

David Astely et al., "TD-LTE—The radio-access solution for IMT-Advanced/TDD,"CHINACOM, 2010 5th International ICST Conference on, IEEE, Aug. 25, 2010, pp. 1-5.*

Calcev, et al., "Opportunistic two-hop relays for OFDMA cellular networks," 2008 IEEE GLOBECOM Workshops, Nov. 2008, pp. 1-6.

International Search Report and Written Opinion—PCT/US2013/065739—ISA/EPO—Dec. 18, 2013.

Raghothaman, et al. "System Architecture for a Cellular Network with Cooperative Mobile Relay," Vehicular Technology Conference (VTC Fall), 2011 IEEE, pp. 1-5.

Vanganuru, et al., "Uplink system capacity of a cellular network with cooperative mobile relay," Wireless Telecommunications Symposium (WTS), Apr. 2011, pp. 1-7.

* cited by examiner

ARCHITECTURE FOR RELAYS IN LTE USING D2D

BACKGROUND

1. Field

The present disclosure relates generally to communication systems, and more particularly, to an architecture for in-band relaying in a long term evolution (LTE) communication system using a device-to-device (D2D) communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives downlink data from a base station via a downlink resource, sends the downlink data to a user equipment (UE) via an uplink resource, receives uplink data from the UE via the uplink resource, and sends the uplink data to the base station via the uplink resource. The apparatus also determines at least one of an observed downlink signal-to-interference-plus-noise ratio (SINR) observed or an observed uplink interference. The apparatus then broadcasts a relay availability based on the determination that the at least one of the downlink SINR observed is greater than a first threshold or the uplink interference at the relay is less than a second threshold.

In another aspect, the apparatus receives downlink data from a relay via an uplink resource and sends to the relay uplink data via the uplink resource. The apparatus may receive an indication of at least one downlink SINR observed by the relay, determine at least one observed downlink SINR, and select the relay for communication based on a ratio of the downlink SINR observed by the relay and the observed downlink SINR. The apparatus may also receive an indication of an uplink interference observed by the relay, determine a pathloss between the apparatus and the relay based on the received indication, determine an observed uplink interference, and select the relay for communication based on at least one of a first product of the pathloss and the uplink interference observed by the relay, or a second product of the pathloss and the observed uplink interference.

DETAILED DESCRIPTION

Figure 1:
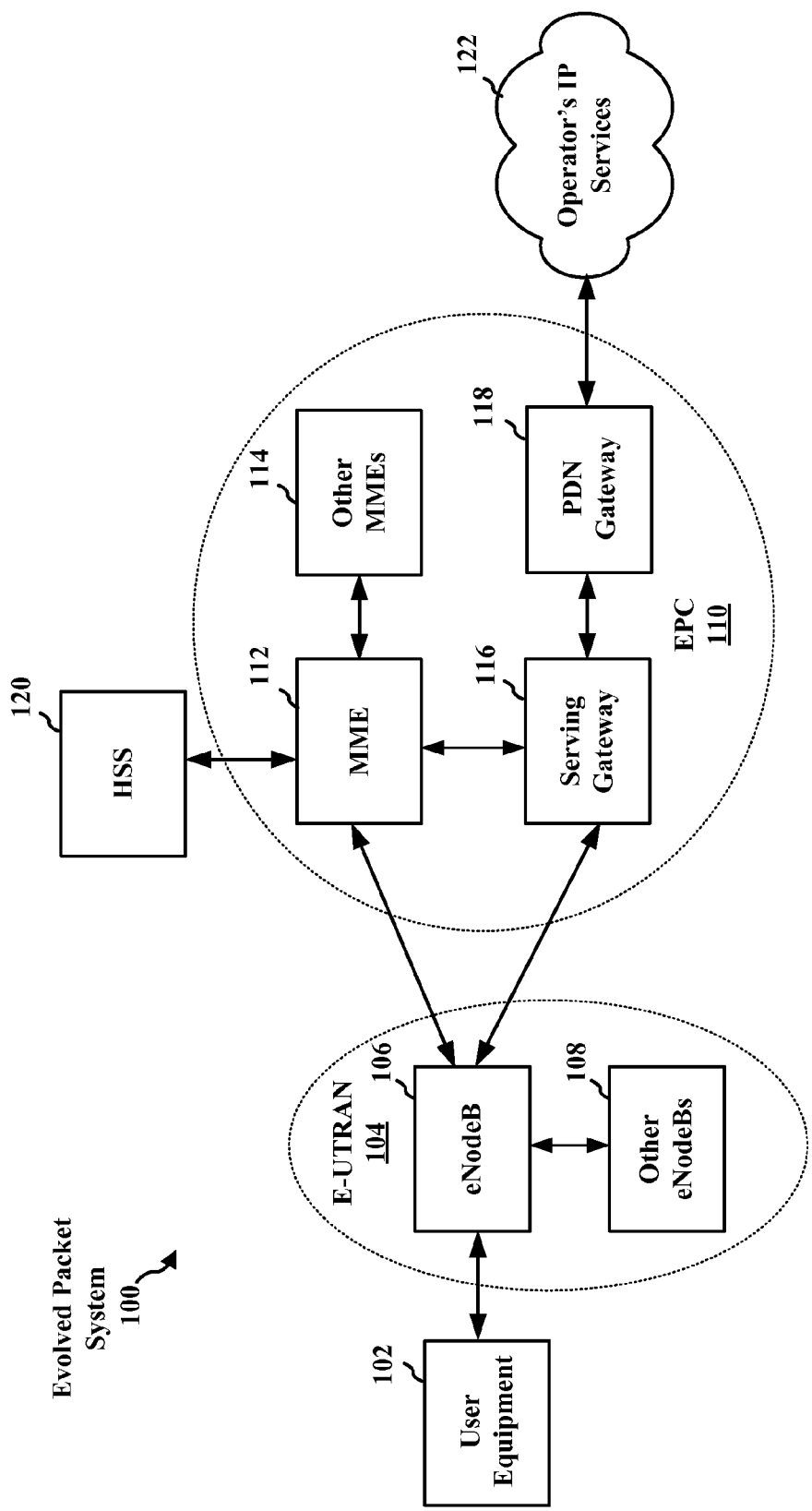
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
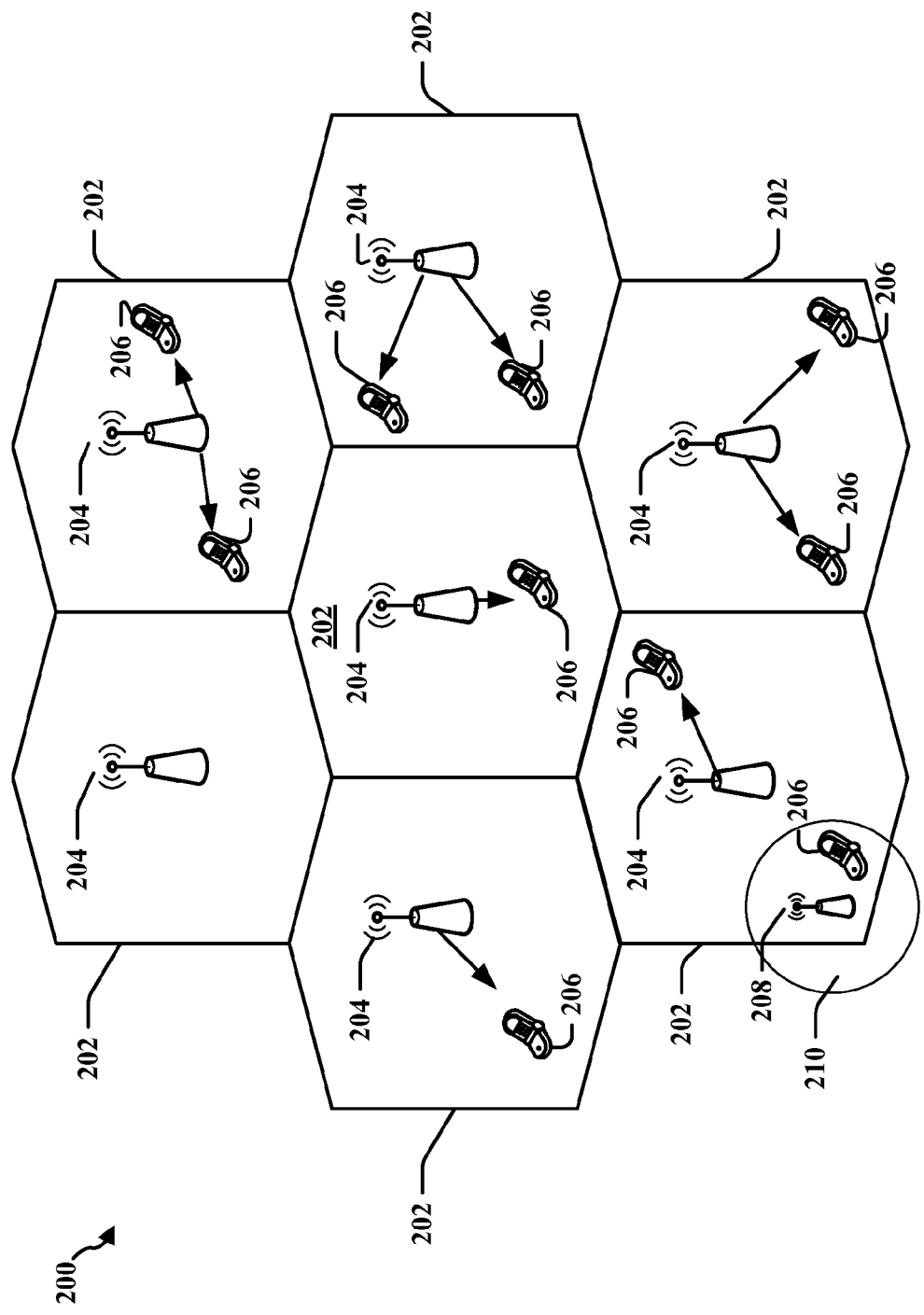
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
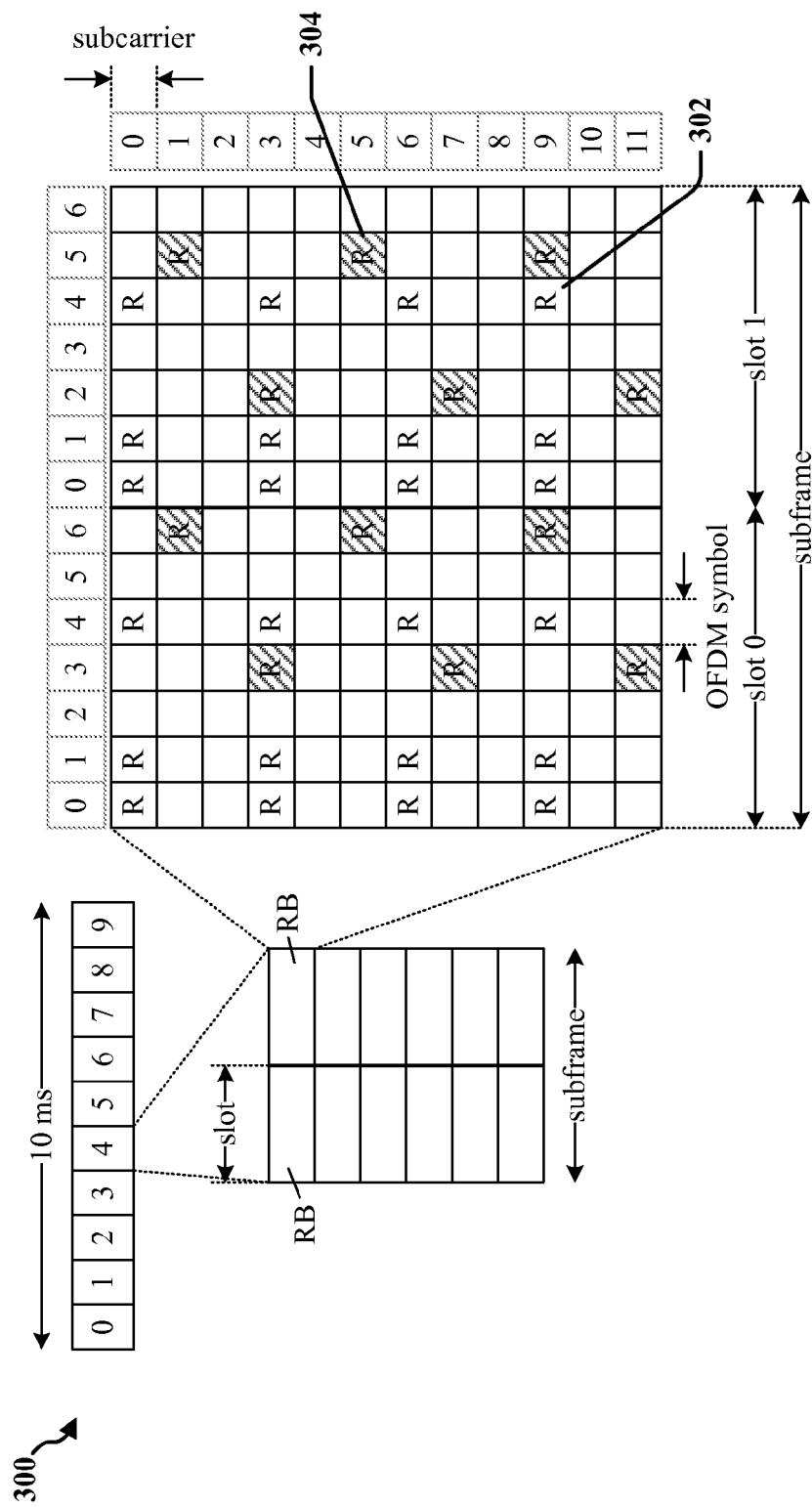
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
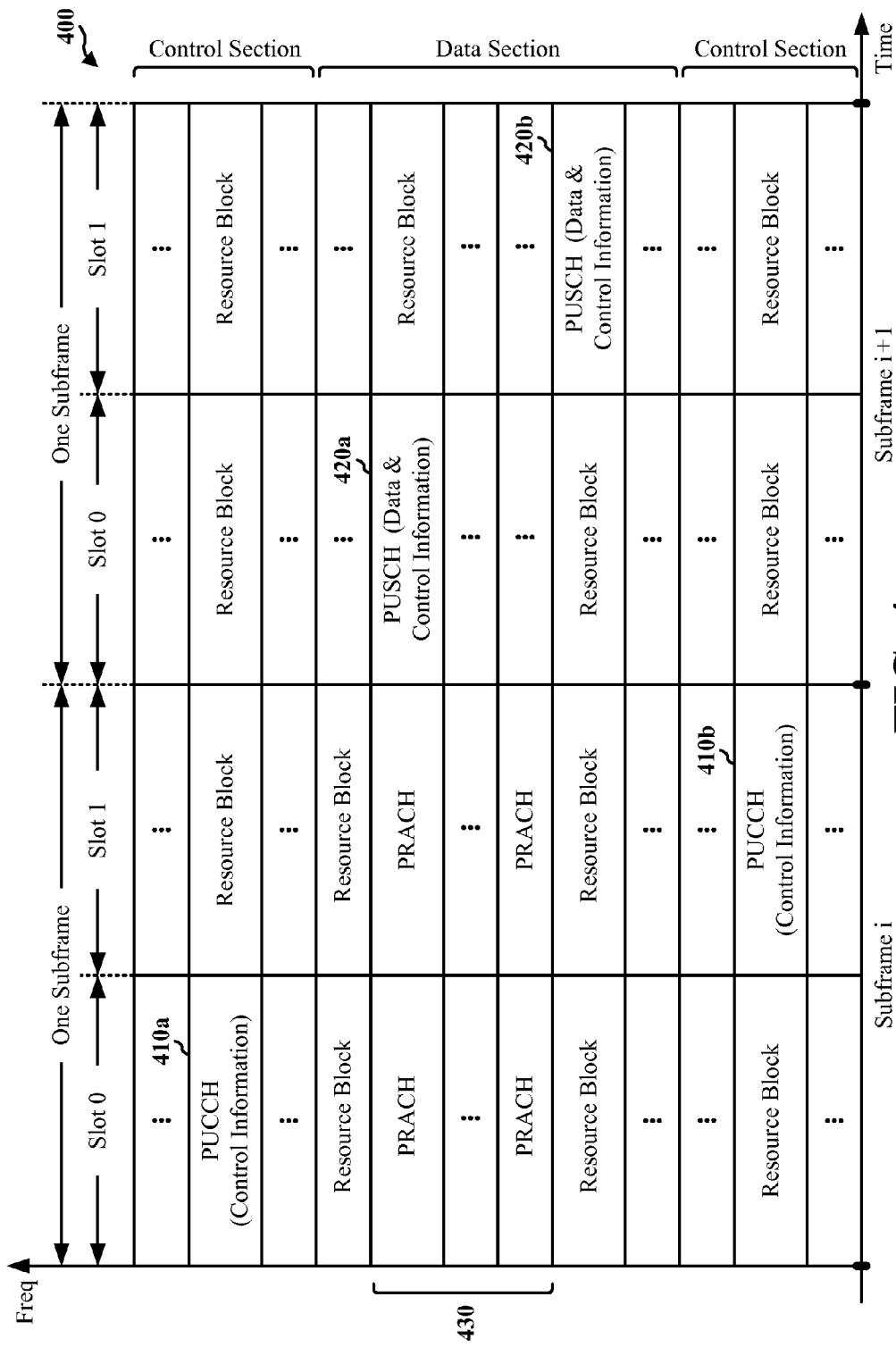
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
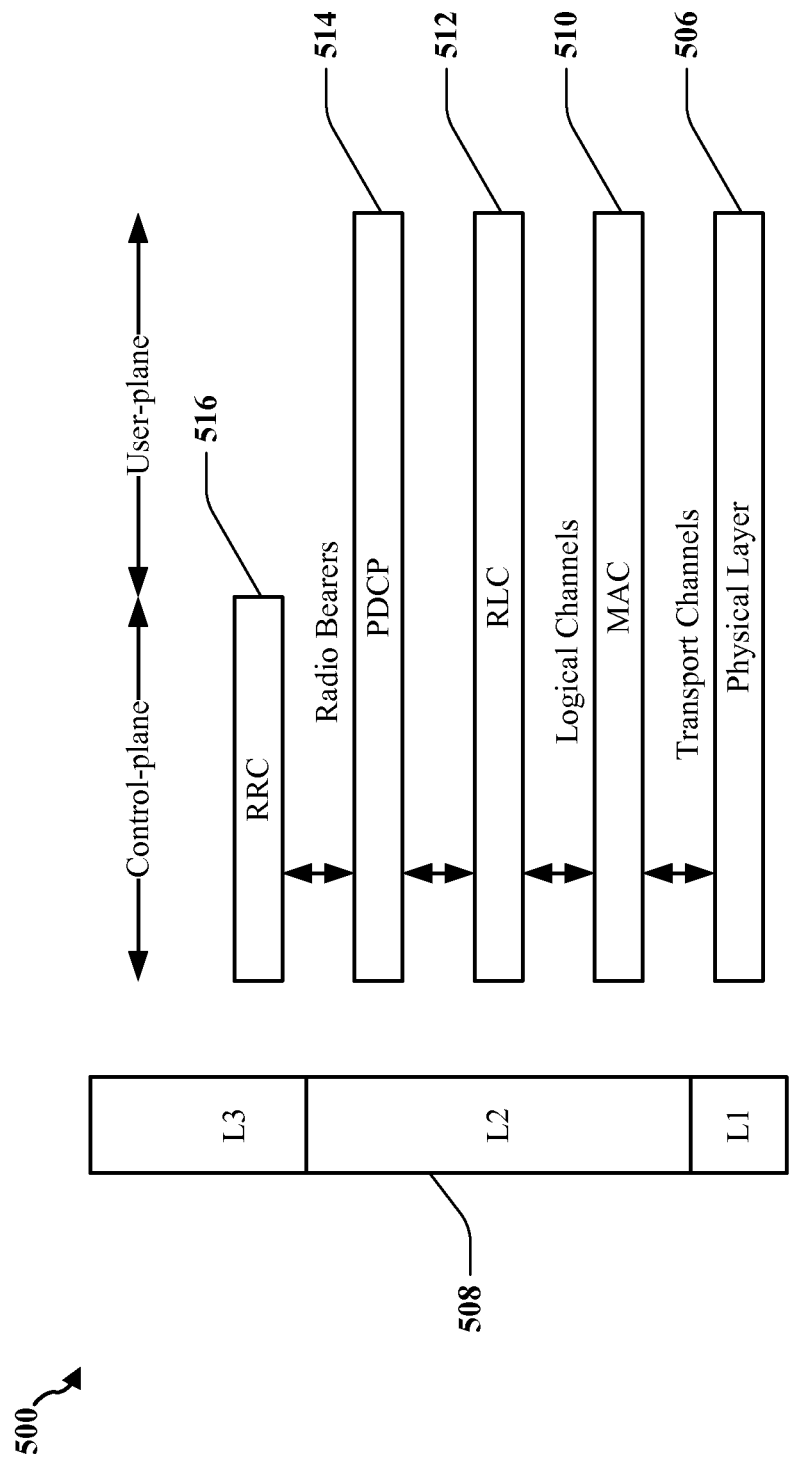
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
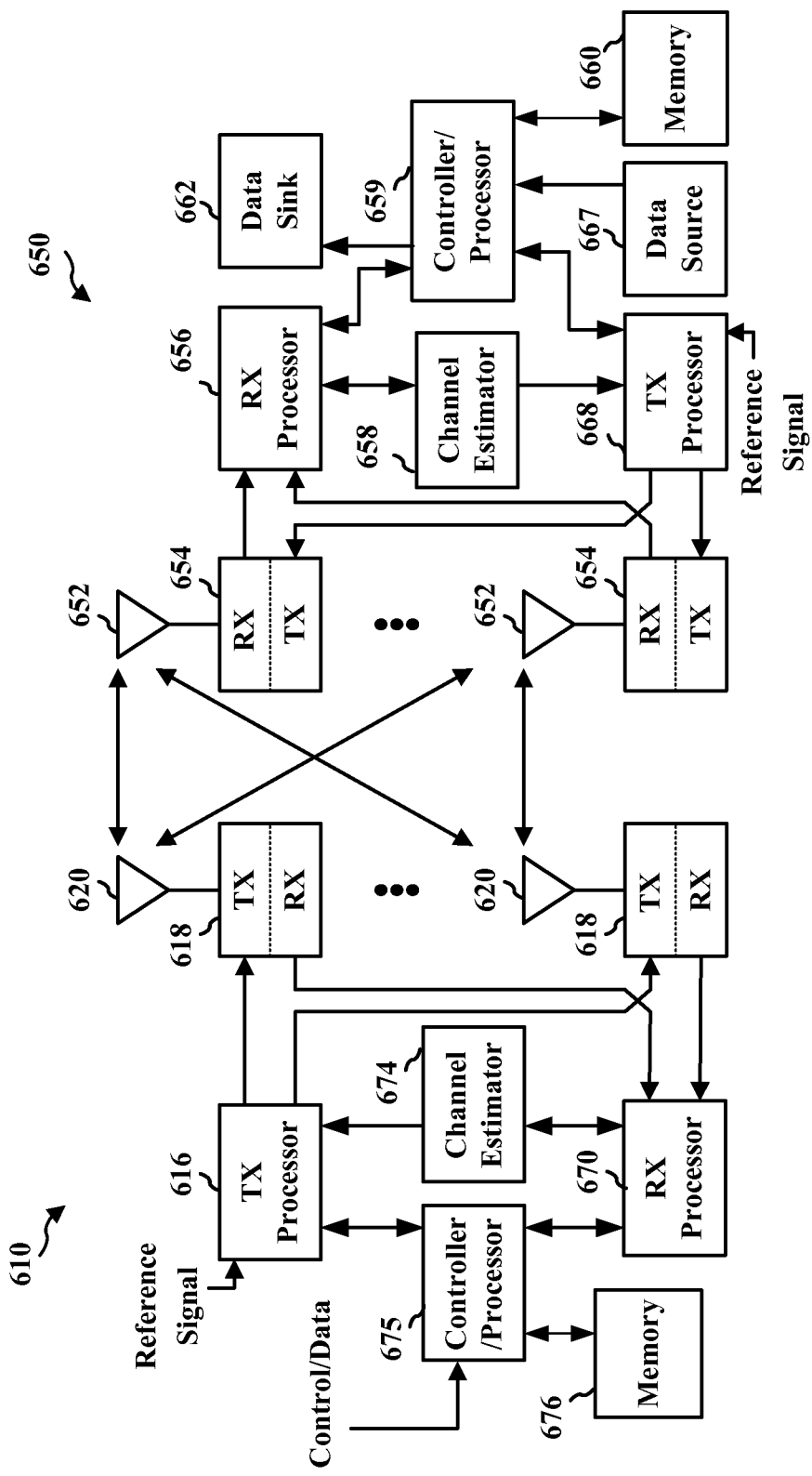
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
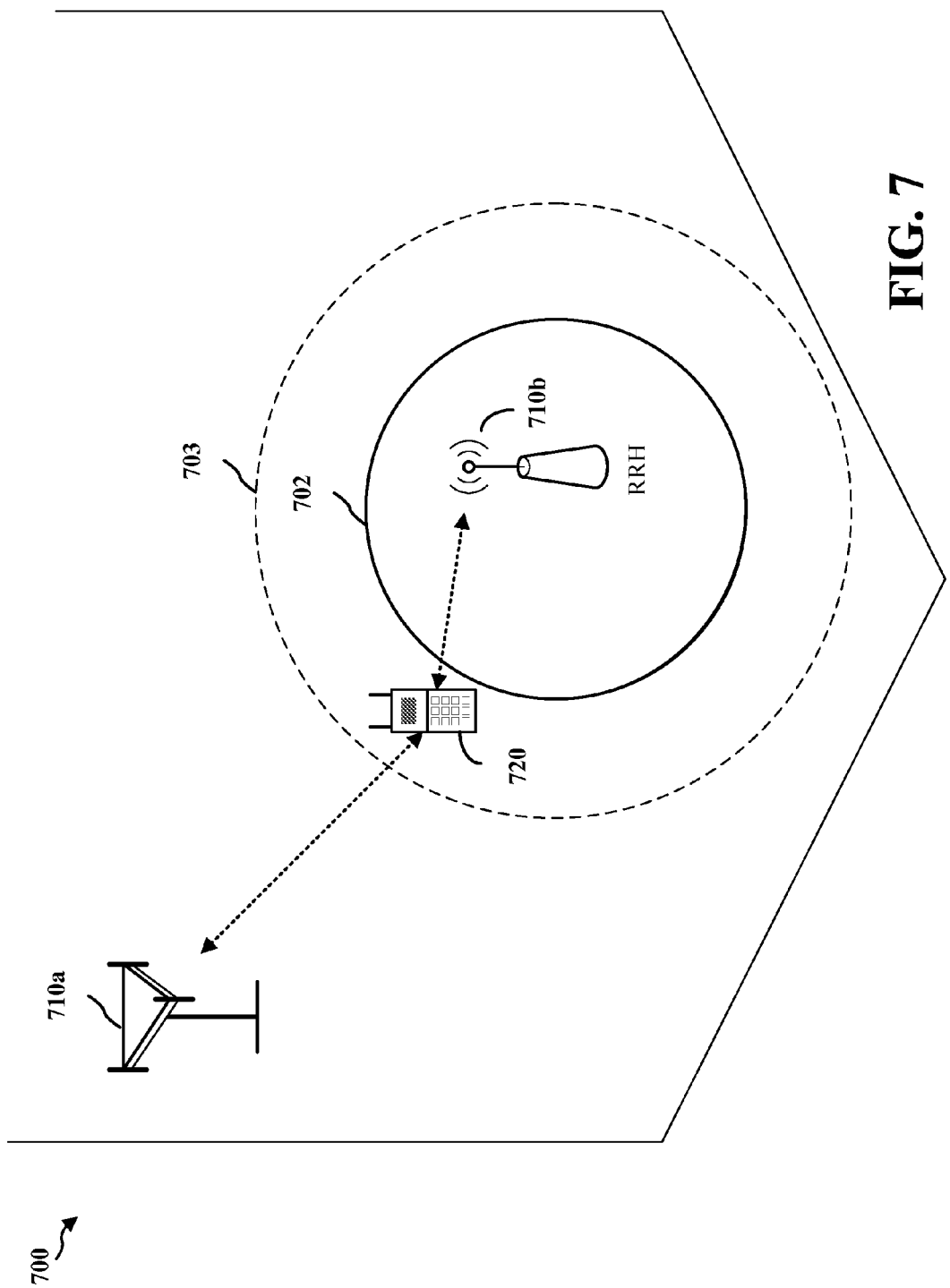
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
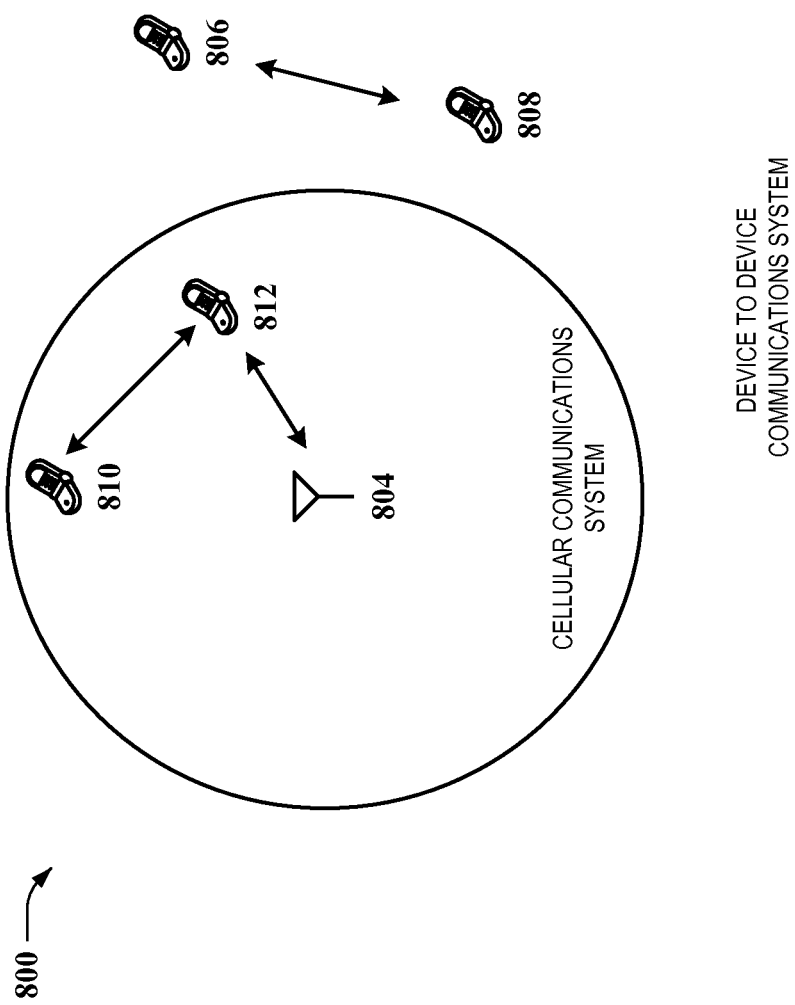
FIG. 8 is a diagram of an exemplary device-to-device (D2D) communications system.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN). Some of the wireless devices 806, 808, 810, 812 may communicate together in device-to-device communication, some may communicate with the base station 804, and some may do both. For example, as shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

An LTE communication system may utilize relays to facilitate communication between a UE and a base station. Current relays are similar to base stations, and essentially split a UE-base station link into two links: 1) an access link; and 2) a backhaul link. The access link refers to the link between an edge UE and the relay. The backhaul link refers to the link between the relay and the base station. If the relay is reasonably located in an ideal position, signaling on the backhaul link may be much stronger than signaling on an actual direct link between the base station and the edge UE. Hence, system throughput is improved. In an aspect, D2D technology may be utilized for relaying in an LTE communication system. This may include using a UE as the relay, and implementing a new relay architecture between a relay UE and an edge UE.

Figure 9:
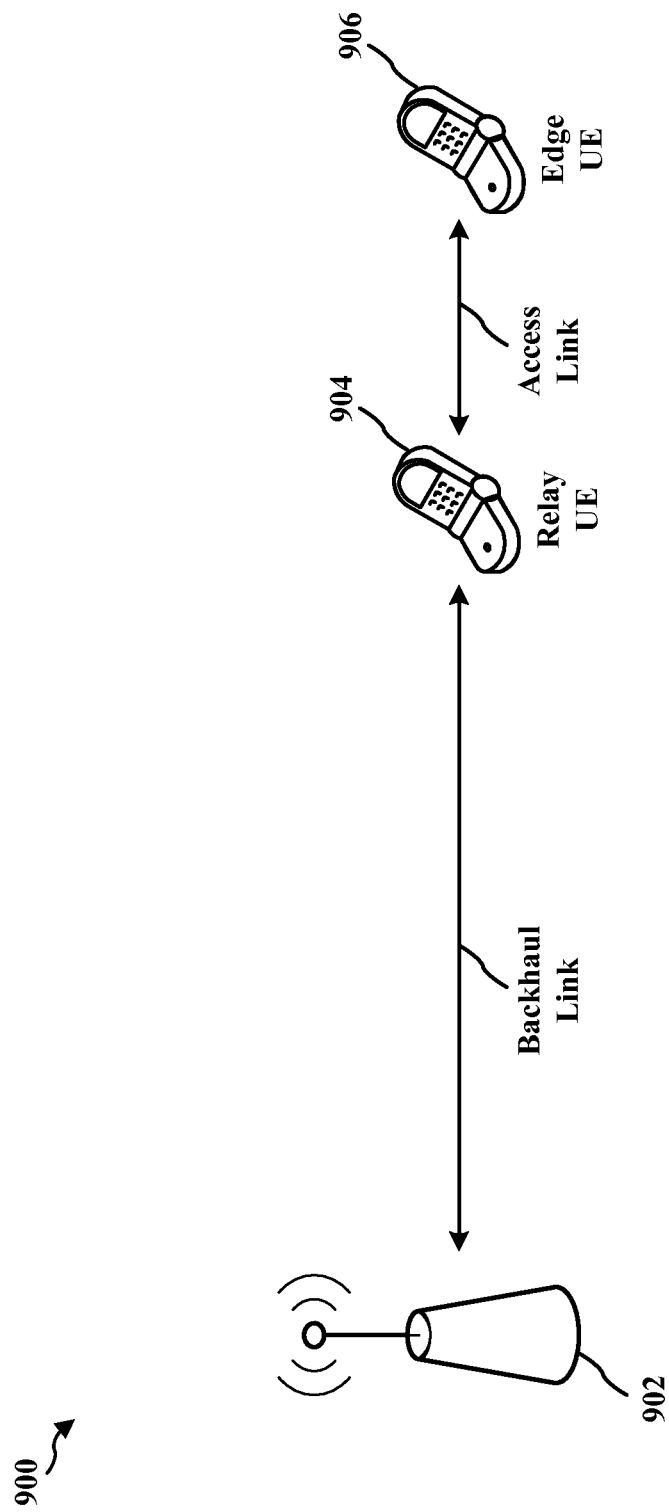
FIG. 9 is a diagram illustrating exemplary relaying in a communication system.

FIG. 9 is a diagram 900 illustrating exemplary relaying in a communication system. A communication link between an eNB 902 and a relay UE 904 may be referred to as a backhaul link. A communication link between the relay UE 904 and an edge UE 906 may be referred to as an access link. In the disclosure, the edge UE may refer to a UE at the edge of a cell. However, the edge UE may also refer to any UE other than the relay UE.

In an aspect, architecture for in-band relaying in an LTE communication system is provided. For in-band relaying, the access link between the relay UE 904 and the edge UE 906 may use an uplink spectrum (uplink resources) for carrying traffic in either an uplink direction or downlink direction. Moreover, for in-band relaying as defined in LTE, the access link may be the same as a traditional LTE link. This ensures that legacy UEs are able to connect to a relay. However, interference management techniques may not likely be suited for current high density and ad-hoc device-to-device (D2D) deployments of relays. Accordingly, architecture is provided for relaying motivated by using UEs as relays. The architecture provides a clean-slate approach to designing a protocol, and for interference management, between an access link and a backhaul link.

The architecture is provided in the context of a frequency division duplex (FDD) system. As stated above, the access link may use uplink resources for carrying traffic in either the uplink direction or downlink direction. A backhaul link between the relay UE 904 and the eNB 902 may still be a traditional LTE link.

The architecture of the present disclosure has various advantages with respect to a legacy architecture. For example, relays are typically used at a cell edge. Therefore, if the relays use the uplink spectrum, an advantage is realized in that the relays' interference with a backhaul link is naturally managed since the relays are far away from an eNB. In another example, a downlink spectrum of a cellular system is typically more congested than an uplink spectrum. Therefore, by moving downlink traffic to the uplink spectrum on the relay link, overall system performance is improved. In a further example, relays may operate in a full duplex manner with respect to the backhaul link and access link for downlink traffic. Hence, the relays can advantageously receive via the backhaul link on the downlink spectrum, and at the same time, transmit downlink data via the access link on the uplink spectrum.

In an aspect, a relay protocol may involve two steps: 1) relay selection; and 2) relaying. During relay selection, an edge UE may select a relay UE based on a high downlink signal-to-interference-plus-noise ratio (SINR) observed by the relay UE for maximizing a downlink backhaul rate, and a low uplink interference between the edge UE and the relay UE to assure a satisfactory access link rate.

During relaying, for downlink relaying, a relay may receive downlink data from an eNB on a downlink spectrum, and relay the downlink data to an edge UE using an uplink spectrum. For uplink relaying, the relay may receive uplink data from the edge UE using an uplink spectrum, and relay the uplink data to the eNB using the uplink spectrum.

Figure 10:
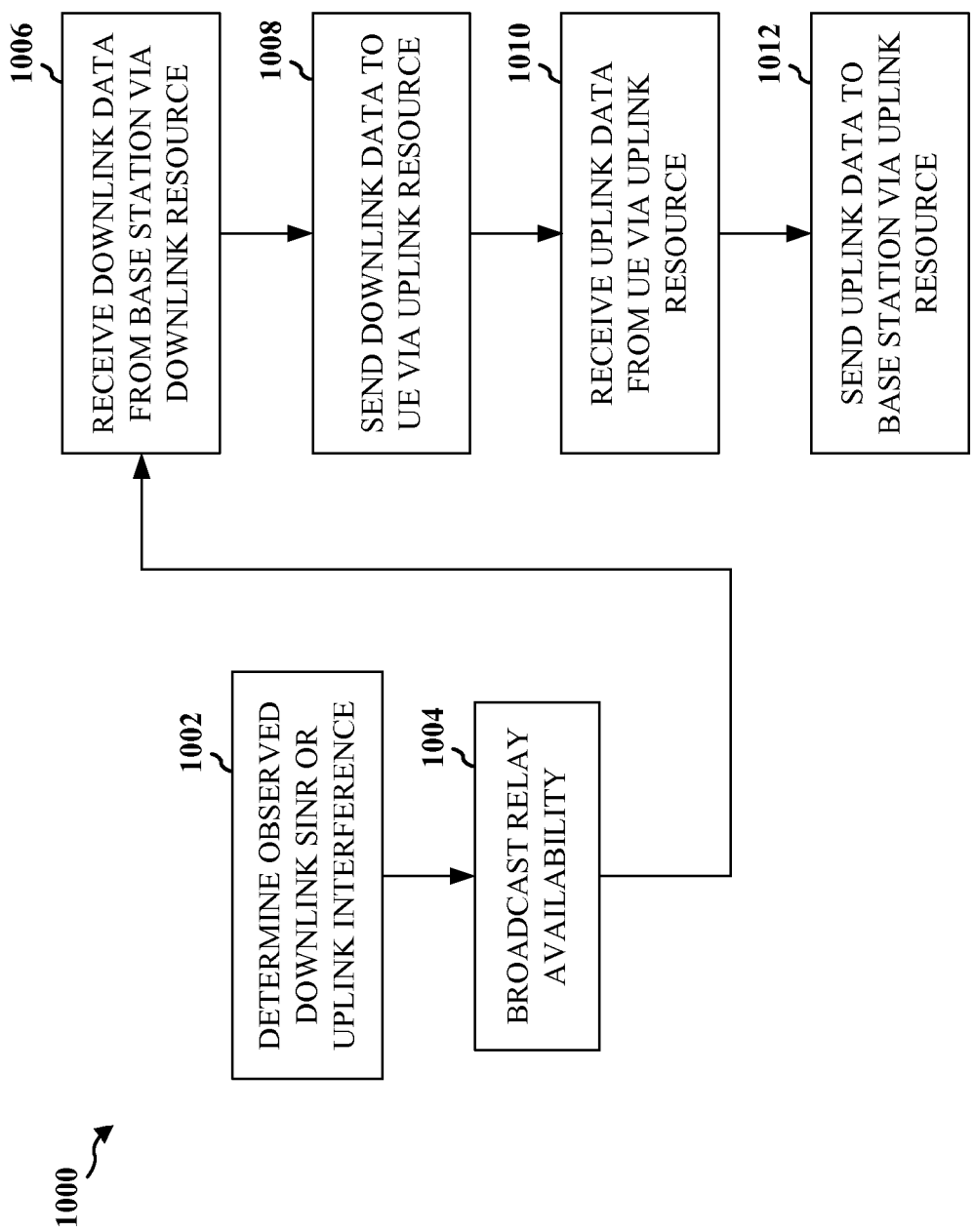
FIG. 10 is a flow chart of a method of wireless communication.

FIG. 10 is a flow chart 1000 of a method of wireless communication. The method may be performed by a relay, such as a relay UE. At step 1002, the relay determines a downlink signal-to-interference-plus-noise ratio (SINR) observed by the relay and/or an uplink interference at the relay. At step 1004, the relay broadcasts a relay availability. The relay availability indicates that the relay is available for communication, and is based on the determination that the downlink SINR observed by the relay is greater than a first threshold and/or the uplink interference at the relay is less than a second threshold.

At step 1006, the relay receives downlink data from a base station via a downlink resource. Thereafter, at step 1008, the relay sends the downlink data from the relay to a UE via an uplink resource.

At step 1010, the relay receives uplink data from the UE via the uplink resource. And at step 1012, the relay sends the uplink data from the relay to the base station via the uplink resource.

Figure 11:
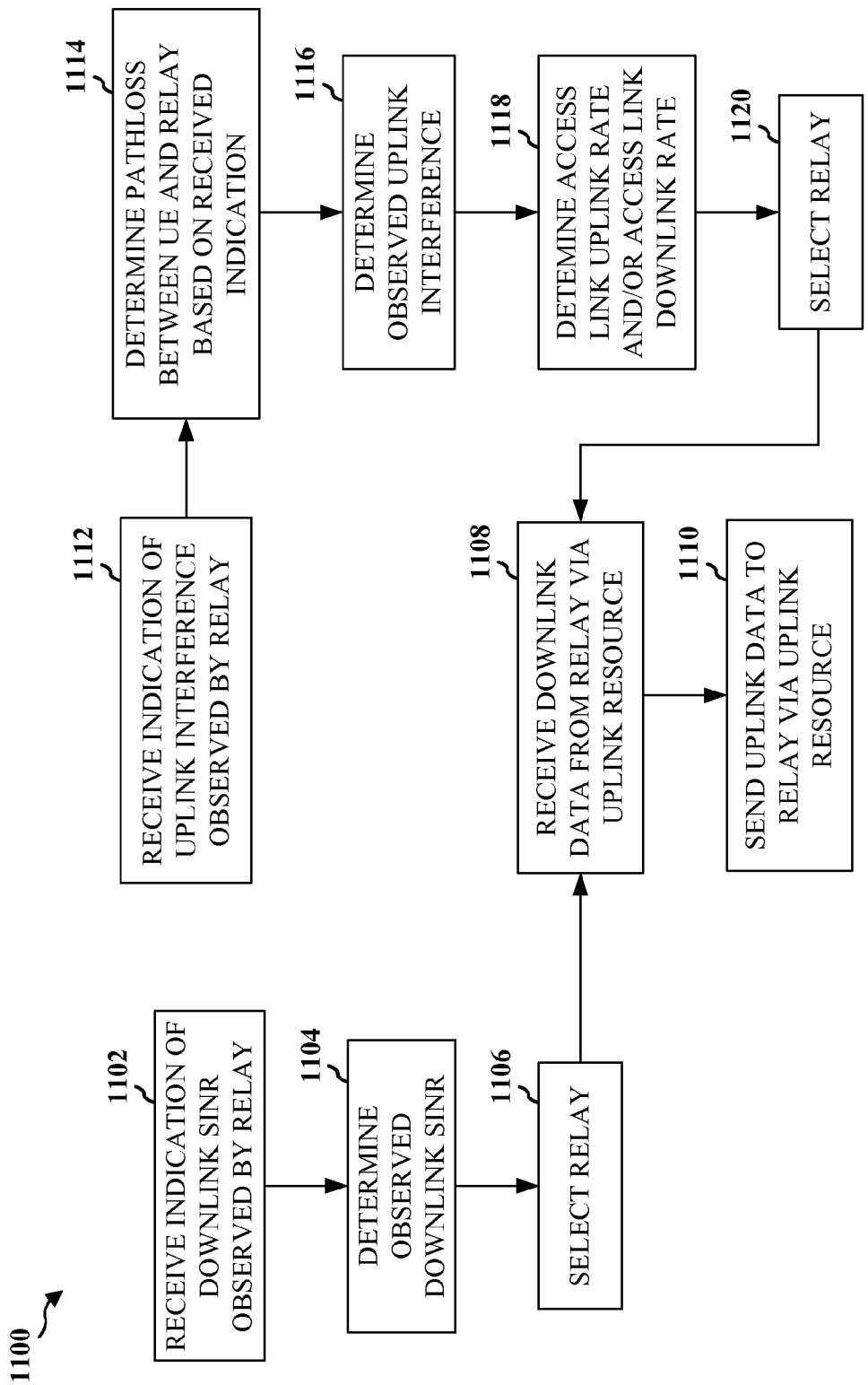
FIG. 11 is a flow chart of a method of wireless communication.

FIG. 11 is a flow chart 1100 of a method of wireless communication. The method may be performed by a UE. At step 1102, the UE receives an indication of at least one downlink SINR observed by a relay. At step 1104, the UE determines at least one downlink SINR observed by the UE. Thereafter, at step 1106, the UE selects a relay for communication based on a ratio of the downlink SINR observed by the relay and the downlink SINR observed by the UE.

Alternatively, at step 1112, the UE receives an indication of an uplink interference observed by a relay. At step 1114, the UE determines a pathloss between the UE and the relay based on the received indication. Thereafter, at step 1116, the UE determines an uplink interference observed by the UE. At step 1118, the UE may determine an access link uplink rate based on the pathloss and the uplink interference observed by the relay. The UE may also determine an access link downlink rate based on the pathloss and the uplink interference observed by the UE. The access link uplink rate may be determined based on a product of the pathloss and the uplink interference observed by the relay. The access link downlink rate may be determined based on a product of the pathloss and the uplink interference observed by the UE.

At step 1120, the UE selects the relay for communication based on at least one of the access link uplink rate or the access link downlink rate. In an aspect, the relay is selected only when at least one of the access link uplink rate is greater than a first threshold or the access link downlink rate is greater than a second threshold.

Subsequent to steps 1106 or 1118, at step 1108, the UE receives downlink data from the relay via an uplink resource. At step 1110, the UE sends uplink data via the uplink resource to the relay.

Figure 12:
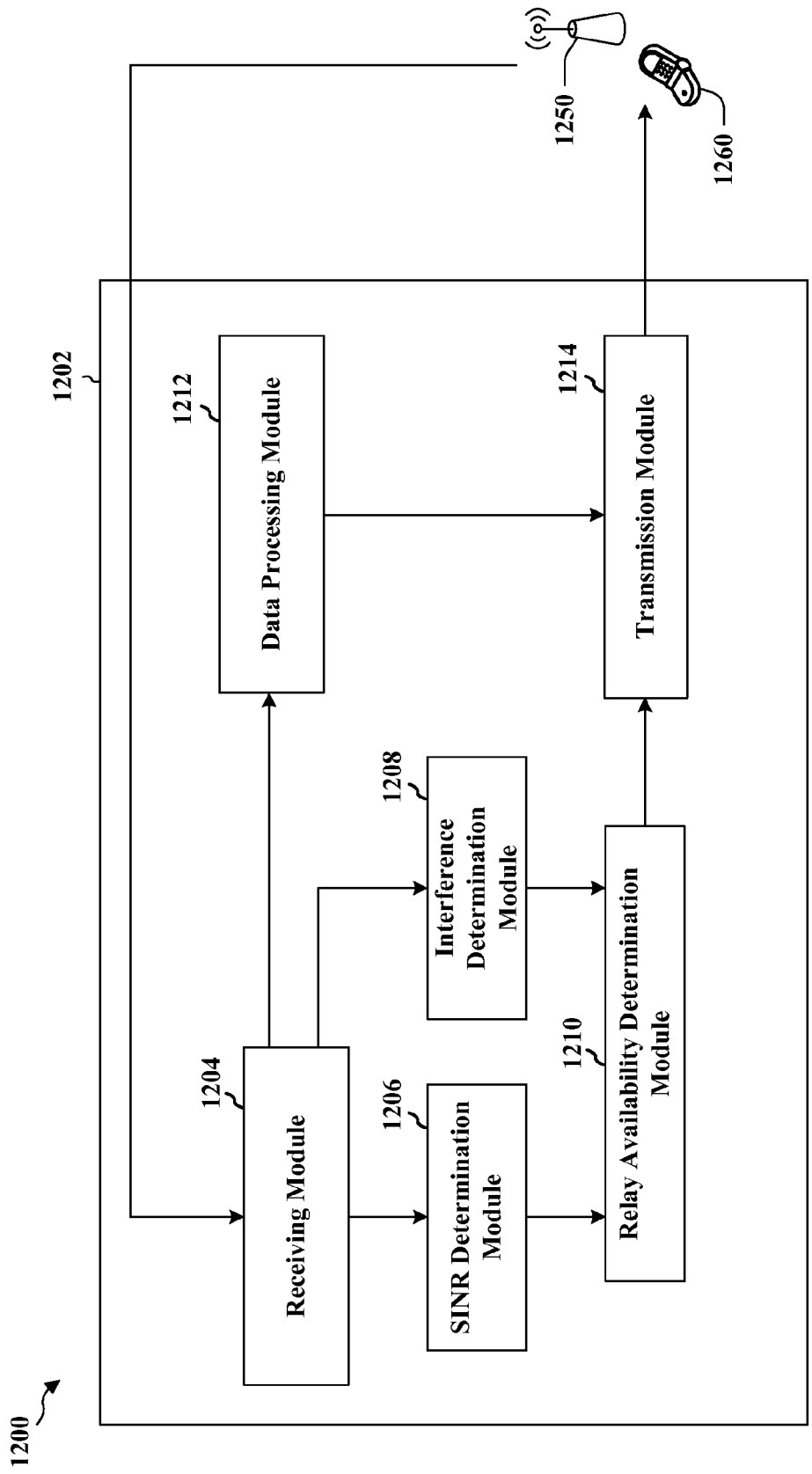
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a relay, such as a relay UE. The apparatus includes a receiving module 1204, a signal-to-interference-plus-noise ratio (SINR) determination module 1206, an interference determination module 1208, a relay availability determination module 1210, a data processing module 1212, and a transmission module 1214.

The SINR determination module 1210 may determine a downlink SINR observed by the apparatus. The interference determination module 1208 may determine an uplink interference at the apparatus. The transmission module 1214 may broadcast a relay availability to the eNB 1250 or the UE 1260. The relay availability indicates that the apparatus is available for communication, and is based on the determination by the relay availability determination module 1210 that the downlink SINR observed by the apparatus is greater than a first threshold and/or the uplink interference at the apparatus is less than a second threshold.

The data processing module 1212 may receive downlink data through the receiving module 1204 from the eNB 1250 via a downlink resource. Thereafter, the data processing module 1212 may send the downlink data to the UE 1260 through the transmission module 1214 via an uplink resource. The data processing module 1212 may also receive uplink data through the receiving module 1204 from the UE 1260 via the uplink resource. Accordingly, the data processing module 1212 may send the uplink data through the transmission module 1214 to the eNB 1250 via the uplink resource.

Figure 13:
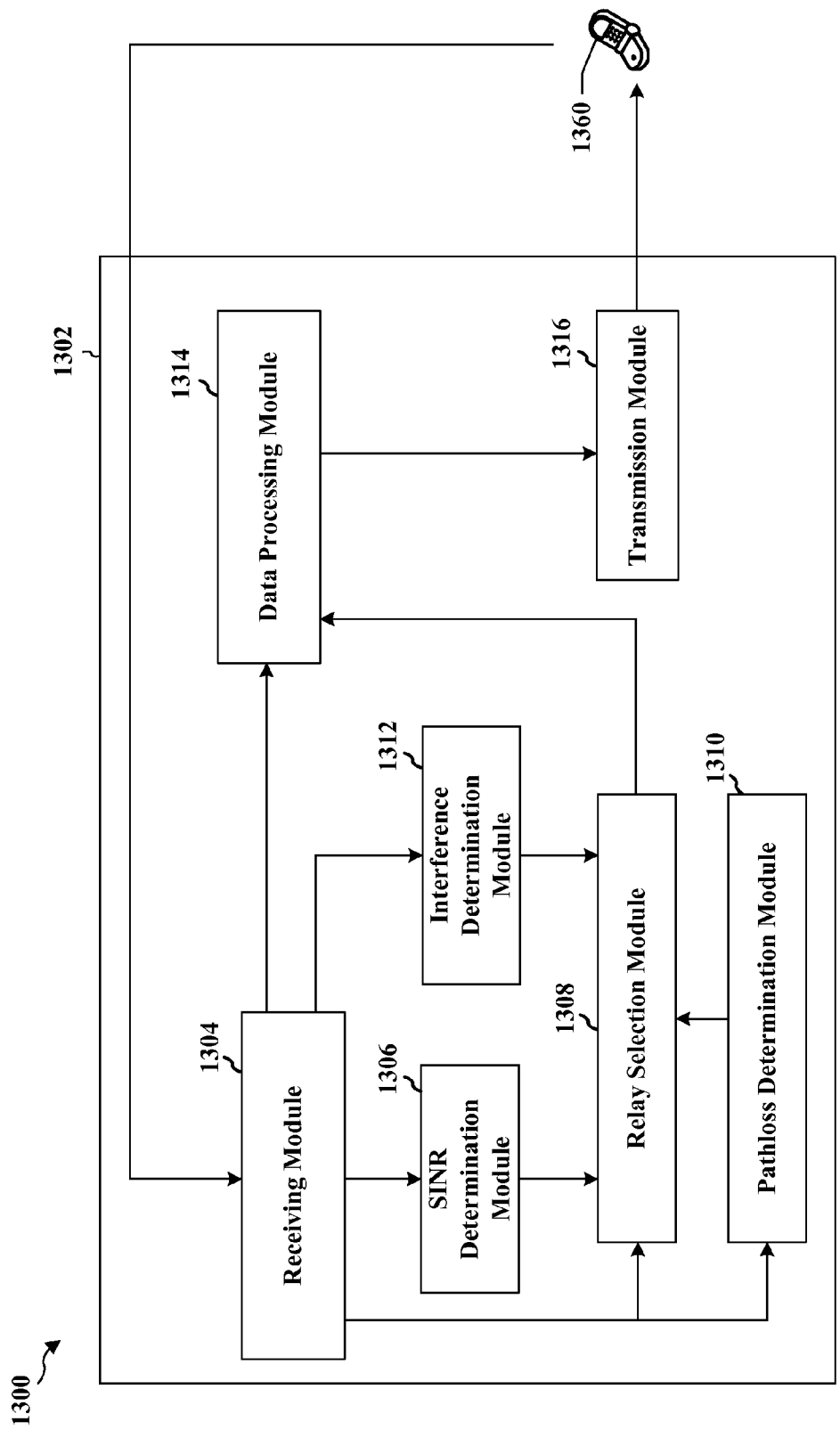
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus includes a receiving module 1304, an SINR determination module 1306, a relay selection module 1308, a pathloss determination module 1310, an interference determination module 1312, a data processing module 1314, and a transmission module 1316.

The receiving module 1304 receives an indication of at least one downlink SINR observed by a relay 1360. The SINR determination module 1306 determines at least one downlink SINR observed by the apparatus. Thereafter, the relay selection module 1308 selects the relay 1360 for communication based on a ratio of the downlink SINR observed by the relay 1360 and the downlink SINR observed by the apparatus.

Alternatively, the receiving module 1304 receives an indication of an uplink interference observed by the relay 1360. The pathloss determination module 1310 determines a pathloss between the apparatus and the relay 1360 based on the received indication. Thereafter, the interference determination module 1312 determines an uplink interference observed by the apparatus. The relay selection module 1308 may determine an access link uplink rate based on the pathloss and the uplink interference observed by the relay 1360. The relay selection module 1308 may also determine an access link downlink rate based on the pathloss and the uplink interference observed by the apparatus. The access link uplink rate may be determined based on a product of the pathloss and the uplink interference observed by the relay 1360. The access link downlink rate may be determined based on a product of the pathloss and the uplink interference observed by the apparatus.

The relay selection module 1308 selects the relay 1360 for communication based on at least one of the access link uplink rate or the access link downlink rate. In an aspect, the relay 1360 is selected only when at least one of the access link uplink rate is greater than a first threshold or the access link downlink rate is greater than a second threshold.

Subsequently, the data processing module 1314 receives downlink data through the receiving module 1304 from the relay 1360 via an uplink resource. The data processing module also sends uplink data through the transmission module 1316 to the relay 1360 via the uplink resource.

The apparatus may include additional modules that perform each of the steps of the algorithm in the aforementioned flow charts of FIGS. 10-11. As such, each step in the aforementioned flow charts of FIGS. 10-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
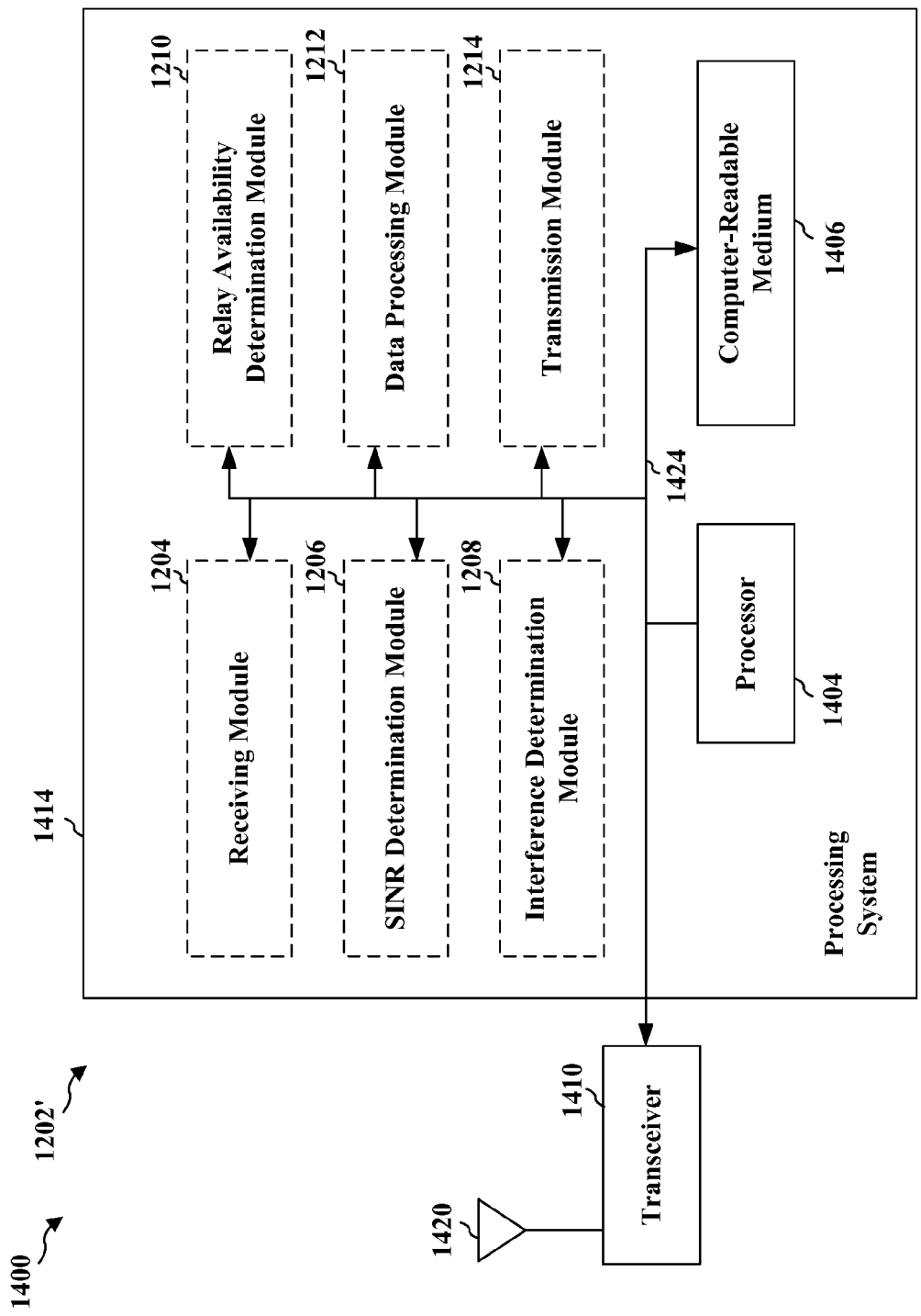
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, 1214, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1204, 1206, 1208, 1210, 1212, and 1214. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1202/1202' for wireless communication includes means for receiving, at a relay, downlink data from a base station via a downlink resource; means for sending the downlink data from the relay to a user equipment (UE) via an uplink resource; means for receiving uplink data at the relay from the UE via the uplink resource; means for sending the uplink data from the relay to the base station via the uplink resource; means for determining at least one of a downlink signal-to-interference-plus-noise ratio (SINR) observed by the relay or an uplink interference at the relay; and means for broadcasting a relay availability based on the determination that the at least one of the downlink SINR observed by the relay is greater than a first threshold or the uplink interference at the relay is less than a second threshold.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15:
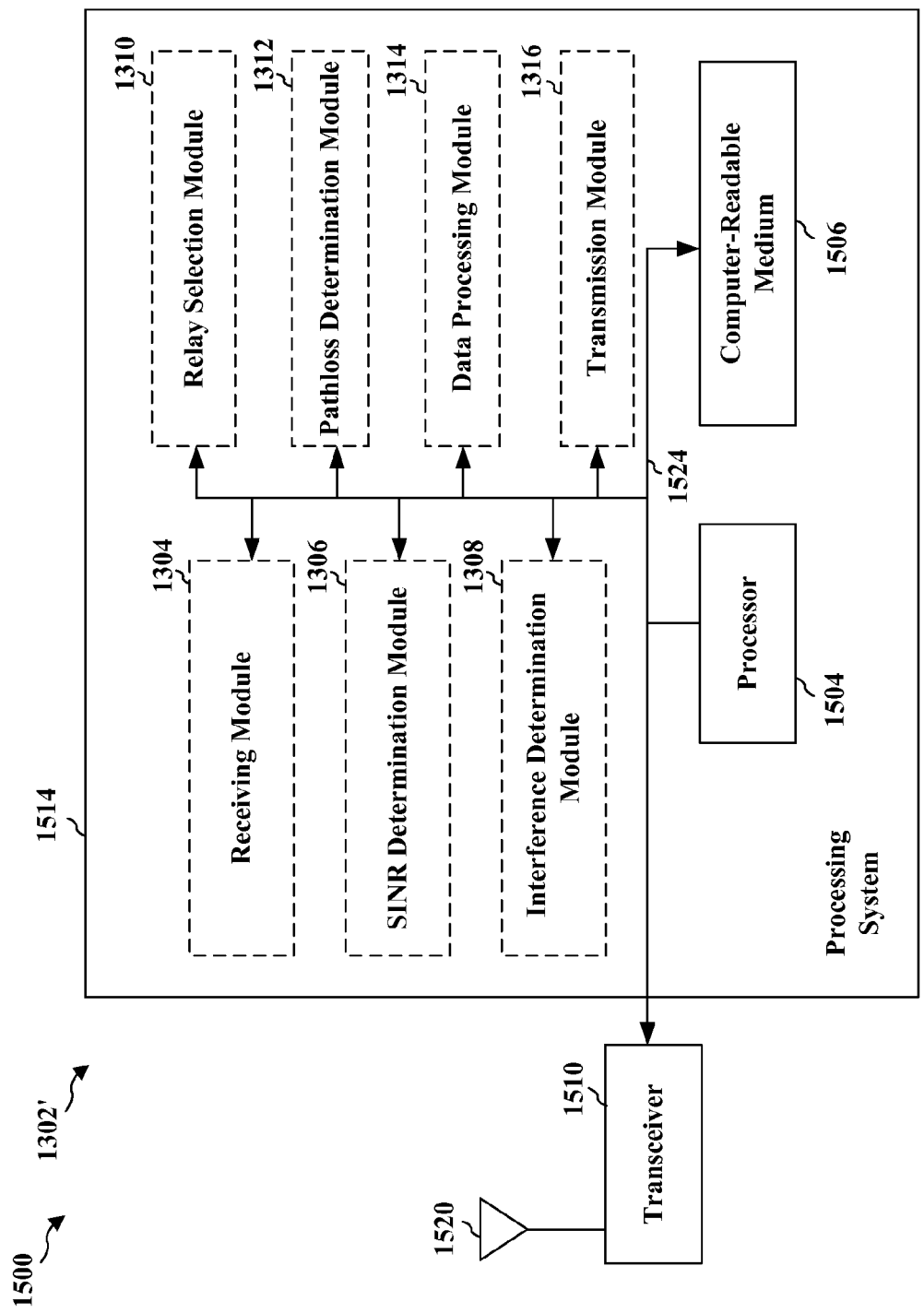
FIG. 15 is a diagram illustrating an example of a hardware implementation for an apparatus employing a processing system.

FIG. 15 is a diagram 1500 illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314, 1316, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1304, 1306, 1308, 1310, 1312, 1314, and 1316. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1302/1302' for wireless communication includes means for receiving, at a user equipment (UE), downlink data from a relay via an uplink resource; means for sending to the relay uplink data via the uplink resource; means for receiving an indication of at least one downlink signal-to-interference-plus-noise ratio (SINR) observed by the relay; means for determining at least one downlink SINR observed by the UE; means for selecting the relay for communication based on a ratio of the downlink SINR observed by the relay and the downlink SINR observed by the UE; means for receiving an indication of an uplink interference observed by the relay; means for determining a pathloss between the UE and the relay based on the received indication; means for determining an uplink interference observed by the UE; and means for selecting the relay for communication based on at least one of a first product of the pathloss and the uplink interference observed by the relay, or a second product of the pathloss and the uplink interference observed by the UE.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, at a relay, downlink data from a base station via a downlink resource;
   sending the downlink data from the relay to a user equipment (UE) via an uplink resource;
   determining, at the relay, at least an uplink interference; and
   broadcasting, at the relay, a relay availability based on the determined uplink interference being less than a threshold, to facilitate determination of an access link uplink rate based on the determined uplink interference and a pathloss between the relay and the UE,
   wherein a selection of the relay for communication is based on at least the access link uplink rate or an access link downlink rate based on the pathloss and an uplink interference observed by the UE.

2. The method of claim 1, further comprising:
   receiving uplink data at the relay from the UE via the uplink resource; and
   sending the uplink data from the relay to the base station via the uplink resource.

3. A method of wireless communication, comprising:
   receiving, at a user equipment (UE), downlink data from a relay via an uplink resource;
   sending to the relay uplink data via the uplink resource;
   receiving an indication of an uplink interference observed by the relay;
   determining a pathloss between the UE and the relay based on the received indication;
   determining an uplink interference observed by the UE;
   determining an access link uplink rate based on the pathloss and the uplink interference observed by the relay;
   determining an access link downlink rate based on the pathloss and the uplink interference observed by the UE; and
   selecting the relay for communication based on at least one of the access link uplink rate or the access link downlink rate.

4. The method of claim 3, further comprising:
   receiving an indication of at least one downlink signal-to-interference-plus-noise ratio (SINR) observed by the relay;
   determining at least one downlink SINR observed by the UE; and
   selecting the relay for communication based on a ratio of the downlink SINR observed by the relay and the downlink SINR observed by the UE.

5. The method of claim 3, wherein the access link uplink rate is determined based on a product of the pathloss and the uplink interference observed by the relay.

6. The method of claim 3, wherein the access link downlink rate is determined based on a product of the pathloss and the uplink interference observed by the UE.

7. The method of claim 3, wherein the relay is selected only when at least one of the access link uplink rate is greater than a first threshold or the access link downlink rate is greater than a second threshold.

8. An apparatus for wireless communication, comprising:
   means for receiving, at a relay, downlink data from a base station via a downlink resource;
   means for sending the downlink data from the relay to a user equipment (UE) via an uplink resource;
   means for determining, at the relay, at least an uplink interference; and
   means for broadcasting, at the relay, a relay availability based on the determined uplink interference being less than a threshold, to facilitate determination of an access link uplink rate based on the determined uplink interference and a pathloss between the relay and the UE,
   wherein a selection of the relay for communication is based on at least the access link uplink rate or an access link downlink rate based on the pathloss and an uplink interference observed by the UE.

9. The apparatus of claim 8, further comprising:
   means for receiving uplink data at the relay from the UE via the uplink resource; and
   means for sending the uplink data from the relay to the base station via the uplink resource.

10. An apparatus for wireless communication, comprising:
    means for receiving, at a user equipment (UE), downlink data from a relay via an uplink resource;
    means for sending to the relay uplink data via the uplink resource;
    means for receiving an indication of an uplink interference observed by the relay;
    means for determining a pathloss between the UE and the relay based on the received indication;
    means for determining an uplink interference observed by the UE;
    means for determining an access link uplink rate based on the pathloss and the uplink interference observed by the relay;
    means for determining an access link downlink rate based on the pathloss and the uplink interference observed by the UE; and
    means for selecting the relay for communication based on at least one of the access link uplink rate or the access link downlink rate.

11. The apparatus of claim 10, further comprising:
    means for receiving an indication of at least one downlink signal-to-interference-plus-noise ratio (SINR) observed by the relay;
    means for determining at least one downlink SINR observed by the UE; and
    means for selecting the relay for communication based on a ratio of the downlink SINR observed by the relay and the downlink SINR observed by the UE.

12. The apparatus of claim 10, wherein the access link uplink rate is determined based on a product of the pathloss and the uplink interference observed by the relay.

13. The apparatus of claim 10, wherein the access link downlink rate is determined based on a product of the pathloss and the uplink interference observed by the UE.

14. The apparatus of claim 10, wherein the relay is selected only when at least one of the access link uplink rate is greater than a first threshold or the access link downlink rate is greater than a second threshold.

15. An apparatus for wireless communication, comprising:
    a memory; and
    a processing system coupled to the memory and configured to:
    receive, at a relay, downlink data from a base station via a downlink resource;
    send the downlink data from the relay to a user equipment (UE) via an uplink resource;
    determine, at the relay, at least an uplink interference; and
    broadcast, at the relay, a relay availability based on the determined uplink interference being less than a threshold, to facilitate determination of an access link uplink rate based on the determined uplink interference and a pathloss between the relay and the UE, wherein a selection of the relay for communication is based on at least the access link uplink rate or an access link downlink rate based on the pathloss and an uplink interference observed by the UE.

16. The apparatus of claim 15, the processing system further configured to:
receive uplink data at the relay from the UE via the uplink resource; and
send the uplink data from the relay to the base station via the uplink resource.

17. An apparatus for wireless communication, comprising:
a memory; and
a processing system coupled to the memory and configured to:
receive, at a user equipment (UE), downlink data from a relay via an uplink resource;
send to the relay uplink data via the uplink resource;
receive an indication of an uplink interference observed by the relay;
determine a pathloss between the UE and the relay based on the received indication;
determine an uplink interference observed by the UE;
determine an access link uplink rate based on the pathloss and the uplink interference observed by the relay;
determine an access link downlink rate based on the pathloss and the uplink interference observed by the UE; and
select the relay for communication based on at least one of the access link uplink rate or the access link downlink rate.

18. The apparatus of claim 17, the processing system further configured to:
receive an indication of at least one downlink signal-to-interference-plus-noise ratio (SINR) observed by the relay;
determine at least one downlink SINR observed by the UE; and
select the relay for communication based on a ratio of the downlink SINR observed by the relay and the downlink SINR observed by the UE.

19. The apparatus of claim 17, wherein the access link uplink rate is determined based on a product of the pathloss and the uplink interference observed by the relay.

20. The apparatus of claim 17, wherein the access link downlink rate is determined based on a product of the pathloss and the uplink interference observed by the UE.

21. The apparatus of claim 17, wherein the relay is selected only when at least one of the access link uplink rate is greater than a first threshold or the access link downlink rate is greater than a second threshold.

22. A computer program product, comprising:
a non-transitory computer-readable medium comprising code for:
receiving, at a relay, downlink data from a base station via a downlink resource;
sending the downlink data from the relay to a user equipment (UE) via an uplink resource;
determining, at the relay, at least an uplink interference; and
broadcasting, at the relay, a relay availability based on the determined uplink interference being less than a threshold, to facilitate determination of an access link uplink rate based on the determined uplink interference and a pathloss between the relay and the UE, wherein a selection of the relay for communication is based on at least the access link uplink rate or an access link downlink rate based on the pathloss and an uplink interference observed by the UE.

23. The computer program product of claim 22, the non-transitory computer-readable medium further comprising code for:
receiving uplink data at the relay from the UE via the uplink resource; and
sending the uplink data from the relay to the base station via the uplink resource.

24. A computer program product, comprising:
a non-transitory computer-readable medium comprising code for:
receiving, at a user equipment (UE), downlink data from a relay via an uplink resource;
sending to the relay uplink data via the uplink resource;
receiving an indication of an uplink interference observed by the relay;
determining a pathloss between the UE and the relay based on the received indication;
determining an uplink interference observed by the UE;
determining an access link uplink rate based on the pathloss and the uplink interference observed by the relay;
determining an access link downlink rate based on the pathloss and the uplink interference observed by the UE; and
selecting the relay for communication based on at least one of the access link uplink rate or the access link downlink rate.

25. The computer program product of claim 24, the non-transitory computer-readable medium further comprising code for:
receiving an indication of at least one downlink signal-to-interference-plus-noise ratio (SINR) observed by the relay;
determining at least one downlink SINR observed by the UE; and
selecting the relay for communication based on a ratio of the downlink SINR observed by the relay and the downlink SINR observed by the UE.

26. The computer program product of claim 24, wherein the access link uplink rate is determined based on a product of the pathloss and the uplink interference observed by the relay.

27. The computer program product of claim 24, wherein the access link downlink rate is determined based on a product of the pathloss and the uplink interference observed by the UE.

28. The computer program product of claim 24, wherein the relay is selected only when at least one of the access link uplink rate is greater than a first threshold or the access link downlink rate is greater than a second threshold.

* * * * *